Aug. 19, 1958  H. D. VAN SCIVER II  2,848,595
RESISTANCE WELDING CONTROL
Filed Feb. 6, 1957

$R_{WC}$ — METAL-TO-METAL CONTACT
$R_W$ — METAL RESISTANCE
$R_{EC}$ — ELECTRODE-TO-METAL CONTACT
$R_E$ — ELECTRODE RESISTANCE
TIME

INVENTOR
Herbert D. Van Sciver, II
BY Thomas D. Davenport
ATTORNEY

+# United States Patent Office 2,848,595
Patented Aug. 19, 1958

2,848,595

RESISTANCE WELDING CONTROL

Herbert D. Van Sciver II, Merion Station, Pa., assignor to The Budd Company, Philadelphia, Pa., a corporation of Pennsylvania Application February 6, 1957, Serial No. 638,549

9 Claims. (Cl. 219—108)

My invention pertains to methods and systems for the control of a resistance welding operation and, more particularly, for control of the weld development during such an operation.

Resistance welding is the joining together of the two or more parts of a workpiece by passage of an electric current through the workpiece. Sufficient heat is developed by the current at the workpiece interfaces to fuse the workpiece material into a weld nugget.

It is axiomatic that there are no reliable non-destructive tests for the efficacy of a weld after it has been made. Statistical sampling methods employing test welds are at best expensive, time consuming and not wholly reliable. Further, the prior controls which constrain inputs to a weld according to fixed input functions are unsatisfactory in that they cannot correct for disturbances during the welding operation.

I have discovered that the rate at which the weld nugget is formed is a reliable parameter for control to assure the production of an acceptable weld. Weld nugget formation increasingly shunts the contact resistance between the parts of a workpiece at a rate which depends only upon the rate of growth of the weld nugget. Sensing and control of this resistance change can correct for any disturbances occurring during the welding operation.

Therefore, it is a general object of my invention, to provide an improved method and system for the control of a resistance welding operation.

Another object is to provide a control which prevents disturbances during a welding operation from affecting the quality of a resulting weld.

A more specific object of my invention is to constrain the resistance change during the formation of a weld according to a predetermined function which assures production of an acceptable weld.

According to an illustrative embodiment of my invention, the resistance welding control comprises a continuous sensing of the resistance across the workpiece and adjustment of the input to the workpiece so as to constrain the resistance across the workpiece to follow a function of resistance predetermined to assure production of an acceptable weld. Means are provided, in combination with a resistance welder and an input control, to generate a resistance signal proportional to the ratio of the voltage across and the current through a workpiece, to generate a predetermined function signal to be followed by the workpiece resistance, and to vary the input to the workpiece according to any error in a continuous comparison of the two signals.

The subject matter which I regard as my invention is particularly pointed out and distinctly claimed in the concluding portion of this specification. My invention, however, both as to organization and method of operation, together with further objects and advantages thereof may best be understood by reference to the following description taken in connection with the accompanying drawing in which:

Figure 1:
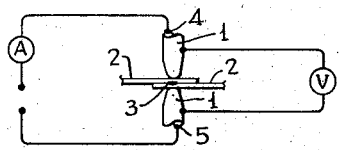
Fig. 1 is a diagrammatic illustration of a workpiece in operational position with respect to a pair of welding electrodes.

In Fig. 1, the electrodes 1, 1 of a resistance welder are shown in contact with the parts 2, 2 of a composite workpiece for explanation of the changes in the several series resistances during the formation of weld nugget, 3. The total resistance between points 4 and 5 includes the metal resistance $R_E$ of the electrodes, the metal resistance $R_W$ of the workpiece parts, the contact resistance $R_{EC}$ between the electrodes and the workpiece, and the interface contact resistance $R_{WC}$ between the parts of the workpiece. The equivalent series resistance of the system may be determined from the ratio of the readings of voltage sensing device V and current sensing device A.

Figure 2:
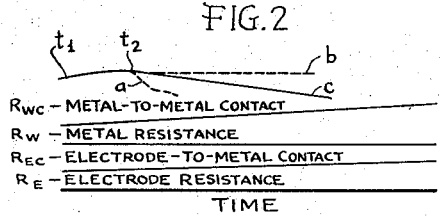
Fig. 2 is a chart showing a family of resistance curves.

A short time after a welding operation is begun these resistances have approximately the values illustrated at $t_1$ of Fig. 2. For clarity, like resistances are lumped together and the ordinates of each curve are shown proportional to the sum of the resistances named below that curve.

The metal resistances increase with slopes determined by the applicable temperature coefficient of resistivity, and the electrode to metal contact resistance decreases due to electrode forging. It is the interface contact resistance, however, which undergoes significant change during a welding operation.

During the prefusion period the interface contact resistance is nearly constant; but with incipient weld nugget formation at time $t_2$ there is a sharp slope change, according to dotted curve $a$ for example.

As the weld nugget grows the interface contact resistance is destroyed at a rate dependent upon the rate of change of the cross-sectional area of the weld nugget at the workpiece interface. Therefore, a signal proportional to the changing workpiece resistance is directly indicative of the manner in which the weld nugget is developed. Conversely, a welding control which constrains the resistance to follow a given function concomitantly constrains the weld nugget growth pattern.

Common causes of failure of a welding operation to produce an acceptable weld are illustrated by the dotted extensions, $a$ and $b$, of the total resistance curve. Curve $a$ is developed when weld nugget growth is so rapid as to cause a "spit," the extrusion of molten metal between the parts of the workpiece. Curve $b$ illustrates a "heat balance" condition, equilibrium between the energy input to the weld and the energy losses, whereupon weld nugget growth ceases and only a sub-standard weld is formed.

The solid extension $c$ of the total resistance curve evidences weld nugget growth which assures the attainment of an acceptable weld. In general, this curve is a monotonically decreasing function of the peak value of the total resistance.

According to this invention, the slope and shape of the constraint function for a given range of workpiece materials or dimensions is determined experimentally and thereafter employed in a comparison with the actual resistance change. Error in this comparison prescribes the adjustment which is made in the input to the weld. If the error is positive (curve c minus curve a) the input to the weld is decreased; if the error is negative (curve c minus curve b) the input is increased, so that the weld nugget growth pattern is constrained in a manner to assure a proper weld during each welding operation.

Figure 3:
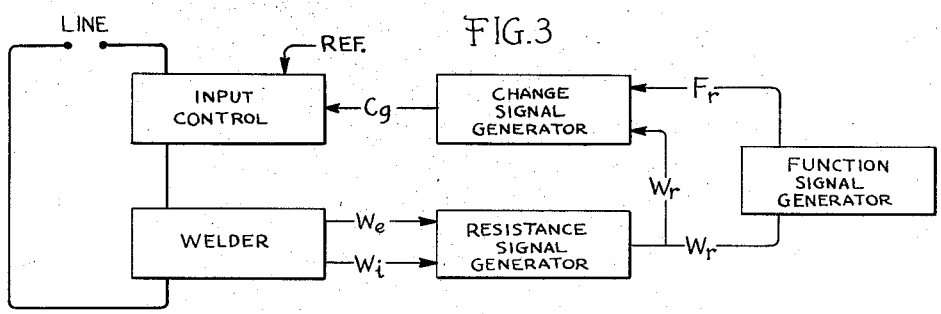
Fig. 3 is a functional diagram of the elements of a welding control in accordance with my invention.

Figure 3 illustrates the functional relationship among the elements embodying this invention. The welder is connected in series with an input control across a source of electrical energy. The welder may be a conventional single phase or polyphase alternating current or direct current resistance welder. The associated input control is chosen for a particular welder type to vary the effective value of the input to the welder in response to a change signal $C_g$. The resistance signal generator is connected to the welder to receive signals, $W_e$ and $W_i$, proportional to the weld current and voltage and generates a signal $W_r$ proportional to the ratio $W_e/W_i$ and hence proportional to the resistance across a workpiece. The function generator, responsive to the weld resistance signal, generates a time function $F_r$, of a value of the $W_r$ signal. The change signal generator sets up a comparison between $F_r$ and $W_r$ and generates change signal $C_g$ proportional to any error in the comparison. This change signal adjusts the input control making the input to the welder such as to produce the desired weld.

Figure 4:
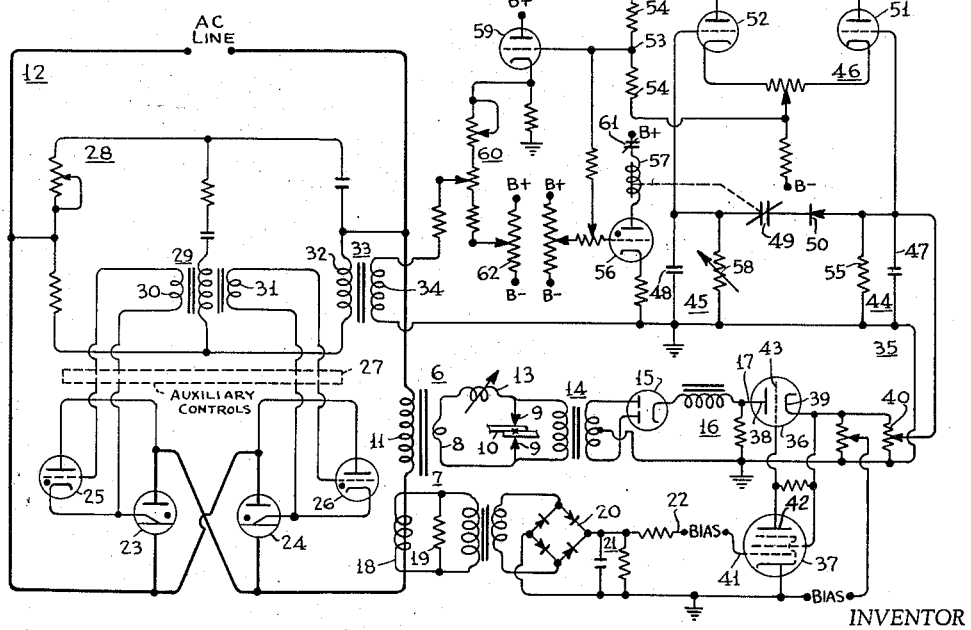
Fig. 4 is a schematic diagram showing application of an embodiment of my invention to a welding circuit.

Figure 4 is an elementary diagram of a preferred control system according to my invention. The system is described in terms of components equivalent to the functional elements of Fig. 3. The circuit of welder 6 includes welding transformer 7 having a secondary winding 8 in series with electrodes 9 contacting a work-piece 10 as in Fig. 1. The welding transformer primary 11 is connected across a source of single phase alternating current in series with input control 12. Variable inductance 13 neutralizes tool inductive effects so that the weld voltage and weld current are in phase. The weld voltage signal $W_e$ is taken from the electrodes at points adjacent the workpiece, applied to decoupling transformer 14, full wave rectifier 15 and filter network 16, and appears on conductor 17 as a postive potential proportional to the voltage across the workpiece. The weld current signal $W_i$ is developed by a winding 18 in series relationship with the welder primary current. The voltage across resistor 19, rectified by bridge 20 and filtered by network 21, appears on conductor 22 as a postive potential proportional to the current through the workpiece.

The input control 12 includes cross connected ignitrons 23 and 24 adapted to transmit alternate half cycles of current from the source to the welder. Thyratrons 25 and 26 and auxiliary timing and control circuits 27 sequence conduction by the ignitron contactor. Explanation of these controls appears in numerous publications such as "Electronic Control of Resistance Welding" by George M. Chute, McGraw-Hill Publishing Company. It should be noted, however, that phase shift bridge 28 includes a peaking transformer 29 with associated secondaries 30 and 31 connected in series relationship between the grid and cathode elements of thyratrons 25 and 26, respectively. Alternating current winding 32 of saturable reactor 33 forms one arm of the bridge network 28. The inductance of inductor 32 is proportional to the direct current flowing through direct current winding 34. The input control 12 as shown is in the form of a phase shift which determines, upon appropriate variation of the current in winding 34, the fraction of each half cycle of the source current applied to the load. This variation is the change signal $C_g$ referred to in connection with Fig. 3.

The resistance signal generator 35 comprises two interconnected amplifiers, triode 36 and pentode 37 and is described in detail in U. S. Patent 2,472,043. The weld voltage signal $W_e$ on conductor 17 is applied to anode 38 of tube 36 and the cathode 39 is returned to ground through potentiometer 40. The weld current signal $W_i$ on conductor 22 is applied to control grid 41 of tube 37. Suitable bias voltages are supplied as shown. The anode 42 of tube 37 is connected to the control grid 43 of tube 36 so that variations of the anode current of tube 37, controlled by the $W_i$ signal on grid 41, cause a variation in the equivalent resistance of amplifier 36 to current passing therethrough due to the $W_e$ signal applied to anode 38. Consequently, the potential across potentiometer 40 is proportional to the ratio $W_e/W_i=W_r$, the resistance across the workpiece in the circuit of welder 6.

The function generator includes resistance-capacitance networks 44 and 45 and differential amplifier 46, examples of which may be found in U. S. Patents, 2,740,044 and 2,677,729, respectively. The weld resistance signal from potentiometer 40 is applied to network 44 charging capacitor 47 to the signal potential. This same potential is applied across capacitor 48 of network 45 through normally closed contacts 49 and diode 50 when $W_r$ is increasing as along the prefusion portion of the total resistance curve of Fig. 2. The voltages impressed on capacitors 47 and 48 appear on the control grids of triodes 51 and 52 of differential amplifier 46. The equivalent plate resistance and the common cathode resistance of amplifier 46 are made equal so that the output voltage appearing at midpoint 53 of the shunting resistor 54 varies only when the grid signals are unequal.

With inflection of the total resistance curve upon incipient weld nugget formation, as at time $t_2$ in Fig. 2, $W_r$ decreases and capacitor 47 discharges through resistor 55. Network 44 is designed to have a relatively small time constant compared to the time constant of network 45. Diode 50 prevents discharge of capacitor 48 through resistor 55. Consequently, the voltage on capacitor 47, applied to the control grid of triode 51, becomes less than the voltage on capacitor 48, applied to the control grid of triode 52, and a positive voltage change results at the amplifier output 53. This positive excursion applied to the control grid of thyratron 56 fires it, causing relay 57 to pick up and open contacts 49 thereby isolating network 45 from the $W_r$ signal applied to network 44.

Capacitor 48 discharges through variable resistor 58 at a rate dependent upon the time constant of this network. The voltage change with respect to time as capacitor 48 discharges develops curve c of Fig. 2 and represents the constraint signal, a function $F_r$ of the peak value of the $W_r$ signal. $F_r$ may be made substantially linear for the short periods encountered in resistance welding operations anid may be given whatever slope is desired by adjustment of the time constant of network 45. Alternatively, $F_r$ may be generated with any desired shape by the substitution of a non-linear resistance element for resistor 58.

Assuming that weld nugget development is such as to cause $W_r$ to tend to differ from $F_r$, the grid voltages of amplifier 46 will unbalance and an output excursion will appear at output point 53 and on the control grid of cathode follower 59. Such an excursion shifts the potential across resistor network 60 and the potential across direct current winding 34 of saturable reactor 33 in phase shift bridge 28 of input control 12. It is apparent then that the excursion of the differential amplifier output at output point 53 is the change signal $C_g$ referred to in the description of Fig. 3.

An increase in the direct current flowing through winding 34 reduces the inductive effect of the saturable reactor 33, shifting the phase of the pulses from peaking transformer 29 to cause conduction by ignitrons 23, 24 later in the alternate half cycles of the source voltage. The effective value of the input to the welder is decreased and the rate of growth of the weld nugget is slowed until the weld resistance signal $W_r$ coincides with the function signal $F_r$ and change signal $C_g$ returns to its initial level. The production of an acceptable weld is thus assured for each welding operation and disturbances effecting weld nugget growth are automatically connected as they occur.

The system is prepared for a welding operation by cycling of contact 61 to reset thyratron 56. An initial or reference value for the input to the weld sufficient to initiate fusion is set by the condition of potentiometer 62. The algebraic sum of the potential at the contact of potentiometer 62 and the in-balance amplifier output voltage at 53 is the reference signal shown in Fig. 3. Current proportional to this reference voltage flows in the direct current winding 34 of the saturable reactor 33.

The weld is begun by operation of the auxiliary controls 27 which may include a manual start switch, a squeeze time delay, an electrode pressure interlock and other conventional control functions. The weld voltage and weld current are monitored and the weld resistance signal generated continuously thereafter. Upon the inflection of the $W_r$ signal coinciding with the prefusion weld resistance peak, the $F_r$ signal is generated. Subsequently, the change signal generator causes correction of the input to the weld as required to constrain the weld nugget development according to the desired function.

I have found it preferable to prescribe $F_r$ as a linear function decreasing with respect to time $t$ according to:

$$F_r = W_{r'} - kW_{r'}t/T = W_{r'}(1-kt/T)$$

where $W_{r'}$ is the peak value of the $W_r$ signal immediately preceding incipient weld nugget formation, $k$ is the fractional resistance concomitant with desired weld nugget development, and T is the desired weld nugget development period. It follows that the preferred negative slope $\theta$ for the $F_r$ signal is given by $\theta = \tan^{-1}(kW_{r'}/T)$.

The factors $k$ and T may be determined experimentally for specific workpiece materials and dimensional configurations. The approximate range for factor $k$ is from 0.15 for carbon steel to 0.40 for copper-base alloys such as Everdure. An illustrative range for the period T is from 4 cycles for 0.010" thick workpiece parts to 30 cycles for 0.125" material (computed for a 60 cycle alternating current input).

While I have shown and described particular embodiments of my invention, it will be obvious to those skilled in the art that many changes and modifications may be made without departing from my invention is its broadest aspects and I, therefore, aim in the appended claims to cover all such changes and modifications as fall within the true spirit and scope of my invention.

What is claimed is:

1. The method of controlling a resistance welding operation on a workpiece which method comprises supplying an electric input to the workpiece until fusion of the workpiece material begins and then continuously adjusting the input rate during the operation to cause the resistance across the workpiece to follow a predetermined function thereof.

2. The method of controlling a resistance welding operation on a workpiece which method comprises supplying an electric input to the workpiece until fusion of the workpiece material begins and then continuously adjusting the input rate during the operation to cause the resistance across the workpiece to follow a predetermined monotonically decreasing function.

3. The method of controlling a resistance welding operation on a workpiece which method comprises supplying an electric input to the workpiece sufficient to initiate fusion of the workpiece material, generating a first signal proportional to the resistance across the workpiece, generating a second signal proportional to a predetermined function of resistance and having an initial value proportional to a peak value of the first signal, setting up a comparison between the first and second signals, generating a change signal in response to the comparison, and adjusting the input to the workpiece during the operation in response to the change signal to assure the production of an acceptable weld.

4. A system for the control of an operation of a resistance welder in which a variable electric input is supplied to a workpiece, which system comprises means connected to the welder generating a first signal proportional to the resistance across the workpiece, means energized by said first signal generating a second signal proportional to a predetermined function of resistance and having an initial value proportional to a peak value of said first signal, means energized by said first and second signals generating a third signal proportional to a difference between said first and second signals, and means energized by said third signal adjusting said variable input to minimize said difference whereby the production of an acceptable weld is assured.

5. The system of claim 4 wherein the predetermined function is a linear function $F_r$ decreasing with respect to time $t$ according to $F_r = W_{r'}(1-kt/T)$ where $W_{r'}$ is a peak value of the first signal, $k$ is a positive fraction and T is a time period.

6. A system for the control of a resistance welding operation in which a variable electric input is supplied to a workpiece, which system comprises weld voltage signal means connected in parallel relationship with the workpiece generating a signal proportional to the voltage across the workpiece, weld current signal means connected in series relationship with the workpiece generating a signal proportional to the current through the workpiece, weld resistance signal means energized by said weld voltage and weld current signals generating a weld resistance signal proportional to the ratio of said weld voltage and weld current signals, function signal generating means energized by said weld resistance signal generating a signal proportional to a predetermined function of resistance and having an initial value equal to a peak value of said resistance signal, comparison means energized by said resistance signal and said function signal generating a change signal proportional to a difference between said resistance signal and said function signal, and control means energized by said change signal and connected in series with the input and the workpiece adjusting the effective value of the input to constrain the resistance of the workpiece to follow said function assuring the production of an acceptable weld.

7. The method of controlling a resistance welding operation wherein desired weld nugget development causes variation of series resistance across a workpiece of a given material according to a known function, which method comprises generating a signal proportional to series resistance across the workpiece, supplying an electric input to the workpiece at a level sufficient to initiate fusion of the workpiece material, and during the period between initiation of fusion and termination of the operation adjusting the input level according to any deviation of the rate of change of the signal from the rate of change of the function.

8. The method of controlling a resistance welding operation wherein desired weld nugget development causes variation of series resistance across a workpiece of a given material according to a known function, which method comprises generating a first signal proportional to series resistance across the workpiece, supplying an electric input to the workpiece at a level sufficient to initiate fusion of the workpiece material, generating a second signal having a value initially equal to the value of the first signal upon initiation of fusion and varying with time substantially according to the known function, setting up a comparison between the first and second signals, generating a change signal in response to the comparison and adjusting the input to the workpiece during the operation in response to the change signal to assure the production of an acceptable weld.

9. A system for the control of an operation of a resistance welder in which a variable electric input is supplied to a workpiece, which system comprises means connected to the welder generating a first signal proportional to the resistance across the workpiece, means energized by said first signal generating a second signal having a value initially equal to the value of the first signal upon initiation of fusion and varying with time according to a predetermined function of resistance, means energized by said first and second signals generating a third signal proportional to a difference between said first and second signals, and means energized by said third signal adjusting said variable input to minimize said difference whereby the production of an acceptable weld is assured.

References Cited in the file of this patent

UNITED STATES PATENTS

| | | |
|---|---|---|
| 2,224,733 | Konig et al. | Dec. 10, 1940 |
| 2,472,043 | Callender | May 31, 1949 |
| 2,508,329 | Van Sciver | May 16, 1950 |
| 2,740,044 | Storm | Mar. 27, 1956 |